INVENTORS
Kenichi Maeda
Toshiyuki Sakai
Shuji Doshita
BY Watson, Cole, Grindle & Watson
ATTORNEYS INVENTORS
Kenichi Maeda
Toshiyuki Sakai
Shuji Doshita
By Watson, Cole, Grindle & Watson
Attorneys INVENTORS
Kenichi Maeda
Toshiyuki Sakai
Shuji Doshita
By Watson, Cole, Grindle & Watson
Attorneys INVENTORS
Kenichi Maeda
Toshiyuki Sakai
Shuji Doshita,
By Watson, Cole, Grindle & Watson
Attorneys INVENTORS
Kenichi Maeda
Toshiyuki Sakai
Shuji Doshita
By Watson, Cole, Grindle, & Watson
Attorneys INVENTORS
Kenichi Maeda
Toshiyuki Sakai
Shuji Doshita,
BY Watson, Cole, Grindle, & Watson
ATTORNEYS United States Patent Office 3,265,814

Patented August 9, 1966

3,265,814
PHONETIC TYPEWRITER SYSTEM

Kenichi Maeda, Kyoto, Toshiyuki Sakai, Takatsuki, and Shuji Doshita, Senboku County, Japan, assignors to Nippon Telegraph and Telephone Public Corporation, Tokyo, Japan, a corporation of Japan Filed Nov. 30, 1964, Ser. No. 414,810
Claims priority, application Japan, Mar. 20, 1961, 36/9,323
8 Claims. (Cl. 179—1)

This is a continuation-in-part of the copending application, Serial Number 120,056, filed June 27, 1961, and now abandoned, and relates to voice recognition techniques wherein spoken language is automatically converted into electronic signals representative of letters, and more particularly to a phonetic typewriter system which can detect spoken language and convert it to written text.

Direct conversion of the voice into machine language has been attempted, but has been such a complex undertaking in view of various tones, inflections and variations between voice qualities that reliability in detection has limited use to only special purpose voice operated equipment heretofore which processed limited sounds only.

It is therefore an object of this invention to provide an improved system for recognition of the human voice.

It is a further object of the invention to provide a reliable automatic system which can detect spoken language and convert it to written text.

A still further object of the invention is to provide voice processing equipment for converting spoken language into digitally coded information.

Another object is to provide a phonetic typewriter which detects changes of speech sound corresponding to basic recognizable elementary units of language termed phonemes.

The speech recognition system of this invention has incorporated the basic principles of recognition and judgment of sound patterns with a controlling system responsive to ordinary conversational speech. Thus, speech sound wave is segmented into different classes which require different processing methods and each of which correspond to phoneme, all the operation to be completed in real time in parallel. The segmentation is based upon recognizing consonant and vowel sections and examination of time patterns of speech parameters. Thus, analysis of stationary and transient sections in the sound patterns under consideration provide recognition of time points of abrupt speech changes.

Properties such as distance and stability are analyzed, where stability is referenced to the stationary property of pattern and distance to the change of pattern, and these properties afford distinctions between the vowels and stop consonants and between the phoneme sections of the input speech sound. When speech sounds are segmented into phoneme sections and phonemes are detected, they are classified and analyzed, the results are stored in a register and combined in a phoneme recognition circuit. Thus, recognition of words and syllables is accomplished in real time without relying upon the prediction of unknown sound that will come next as required in sequential analysis.

The phonemes are abstract symbols which are mastered by the speaker to become common among all people speaking a language comprising a sequence of these phonemes. When voiced by an individual the phonemes become a complex waveform with frequency, time and intensity components. Thus, frequency discrimination alone cannot serve as a reliable recognition agency for the phonemes.

Each phoneme is defined by shape, size and voicing manner and place of the articulatory organ, and is formed differently depending upon the language, so that there is no absolute standard sound wave for any phoneme. However, our ears detect phonemes and the brain recognizes the essential features to extract phonemes without any confusion. Thus, it is suggested that there exist recognizable differences between different phonemes that may be developed and employed in voice recognition systems.

This has been experimentally confirmed in the case of Japanese mono-syllables in a system we have discovered, as reported in pages 441–450 of the Journal of the Acoustic Society of America, vol. 32, No. 4, April 1960, and page 115 of the "Current Research and Development in Scientific Documentation" of National Science Foundation No. 7, November 1960.

Expansion of these principles into a machine processor for conversational speech becomes feasible because of the modest speed of phoneme production in human speech, whereas, sampling theory considerations indicate otherwise that the amount of information in speech is too great to reasonably process in machines in real time. The machine requirements in such processing are (1) for sampling a section of the speech best adapted for discrimination, (2) for providing operational controls to obtain data for discriminating phonemes in the samples by examining time change of speech pattern, (3) for classifying and analyzing the results of the discrimination, (4) for repetition of the process with a further sample, and (5) for considering co-articulation effect of phonemes with each other in such a way as to permit recognition of single syllables, the treatment of assimilated sounds and syllabic nasals not included in single syllables, the nasalization of vowels and the deformation of single syllables when vowels are omitted, (6) for providing operational control of judging and output control.

Sequences of phonemes are analyzed in part by a zero-crossing analysis to present a pattern in the form of a series of zero-crossing distribution from which changes representing distance and stability representing the phoneme element are detected at different time points, thereby to best point out the various combinations of phonetic orders.

The present invention may be better understood from the following more detailed description when considered with reference to the accompanying drawing, wherein.

Figure 1:
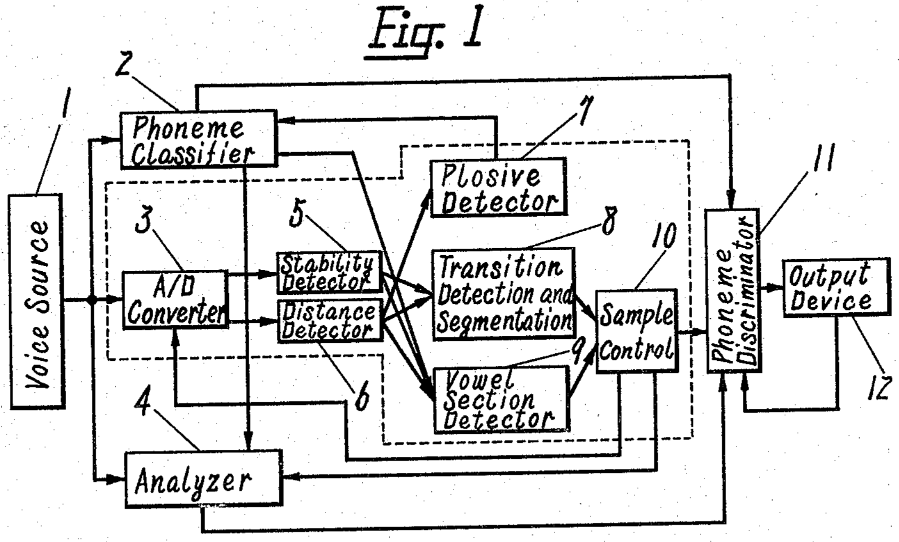
FIGURE 1 is a block system diagram of a system embodying the invention.

As shown in the system organization of FIGURE 1, a voice source 1 provides means for detecting and transducing speech into electrical signals classifiable in phoneme classifier circuit 2 which extracts the distinctive features of phoneme and thereafter distinguish the class of the phonemes. Analog to digital converter 3 and zero-crossing speech analyzer 4 accept signals from the voice source 1 for processing. The stability and distance components are detected in blocks 5 and 6 respectively as fed by signals processed through the analog to digital converter 3. These blocks 5, 6 in turn both feed the time change or transition point determining section 8 and vowel section detector 9. The distance detector 6 alone feeds plosive detector 7 which produces a signal of plosiveness, sending it to phoneme classifier 2. Vowel section detector 9 receives not only an input signal from both the stability detector 5 and the distance detector 6, but also a further input condition from the phoneme extractor 2. Sample control circuit 10 receives input conditions from transition detection 8 and vowel section detector 9, and produces control signals at analyzer circuit 4 and the phoneme discriminator circuit 11. The output device 12 may be a typewriter or other device responsive to coded signals and including a buffer memory which receives data blocks from register of block 11 upon feedback command.

In operation speech is fed through voice source 1 with amplification or delay into the respective blocks 2, 3, and 4. Those blocks within the dotted enclosure comprise the control portion of the system, with the other blocks comprising the recognition portion. Thus the control of the operation of the recognizing portion is directed from the speech sound itself.

I. CONTROL FUNCTIONS

Figures 5, 6, 7:
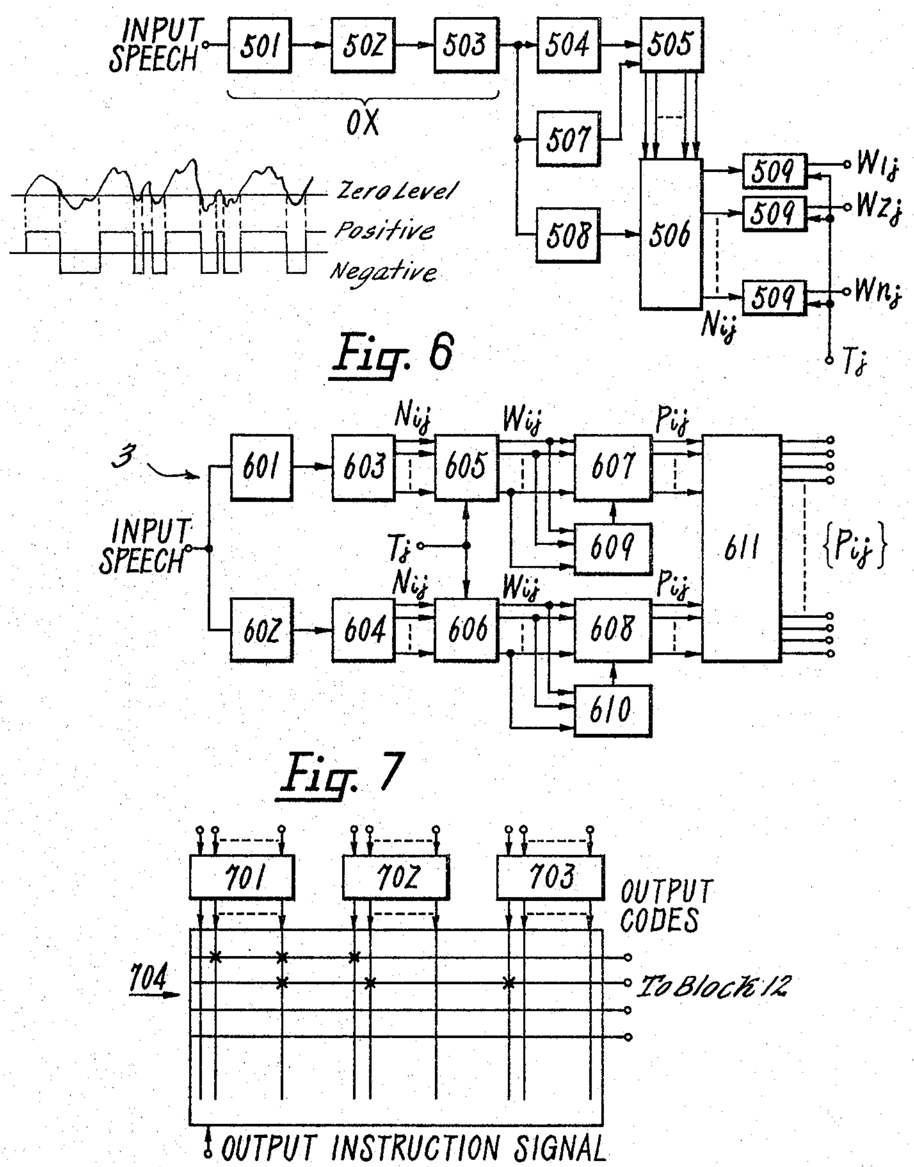
FIGURE 5 is a block circuit diagram of a zero-crossing analyzer constructed in accordance with the invention with accompanying waveform.
FIGURE 6 is a block circuit diagram of an analog to digital converter used in accordance with the invention.
FIGURE 7 is a block circuit diagram of a phoneme discrimination portion.

Consider now a more detailed description of the circuits of FIGURE 1 which will identify the operation of the system. The control portion of the system may be disclosed by consideration first of FIGURE 6, which illustrates the analog to digital conversion of block 3 in FIGURE 1. This converter has two channels to permit distinguishing between frequency components in the region of the first formant (F1) and that in the region of the second formant (F2). These regions are separated by frequency filters 601 and 602 and therein are respectively subjected to zero-crossing wave analysis as shown in the waveform of FIGURE 5. The zero crossing analysis circuits of FIGURE 5 themselves are also contained in the analyzer of block 4 and will be discussed in that connection hereinafter in more detail.

Figure 2:
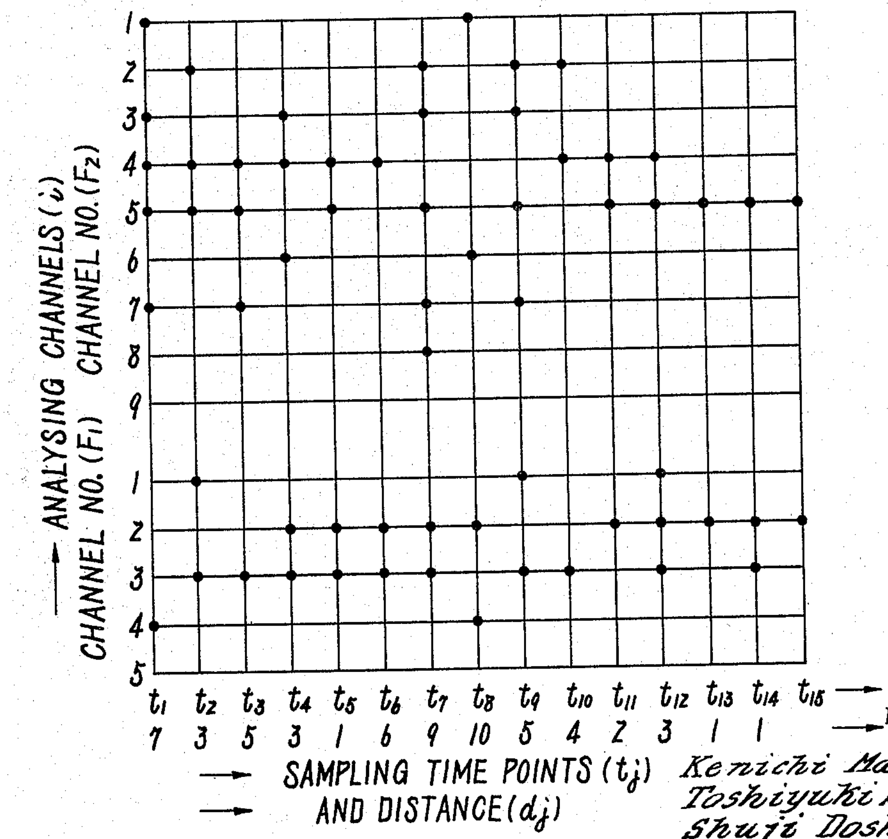
FIGURE 2 is a chart showing an exemplary analyzed speech pattern.

Each formant region may be divided into a number of channels, typically five for the F1 region and 9 for the F2 region. These channels are illustrated in the diagram of FIGURE 2, where the channels are digitalized in "1" or "0" form every time period $t_j$ of $t_1$–$t_{15}$ etc., having a typical duration of 10 milliseconds. Blocks 603 and 604 of FIGURE 6 serve to develop count numbers $N_{ij}$ which are accumulated to $W_{ij}$ in blocks 605 and 606 respectively for the successive time intervals of $T_j$, as is disclosed thereinafter.

Quantizing circuits 607 and 608 digitize the accumulated signals $W_{ij}$ to $P_{ij}$ in every interval $T_j$ to provide the "1" or "0" binary designation if above or below the threshold level $W_{jmax/\alpha}$ ($\alpha>1$), where $W_{jmax}$ is the maximum value of $W_{ij}$ ($i=1, 2, \ldots, n$) for the $j$th interval as obtained in threshold level detectors 609 and 610 where $n$ is the number of channel zero-crossing distributions. Thus $P_{ij}$ ="1" when $W_{ij}$ is equal to or greater than $W_{jmax/\alpha}$ and is equal to "0" when less than $W_{jmax/\alpha}$. The simplified zero-crossing pattern $P=(P_{ij})$ of the input speech which is diagrammatically shown in FIGURE 2 is then introduced in the shift register memory 611.

One of the control functions derived for use in the recogizing system is the separation of the vowel and consonant sections from the input speech sound. For this purpose stability and distance are detected respectively in blocks 5 and 6 of FIGURE 1 from the pattern ($P_{ij}$) obtained from the shift register 611 of FIGURE 6.

*Stability*

The stability control function is extracted from the pattern ($P_{ij}$), and the degree of stability $X_{ij}$ ($l$) is defined as $$\frac{1}{l}\sum_{k=0}^{l-1} P_i(j-k)$$

where $l$ is the number of time points to be considered for this processing of the pattern. Thus $X_{ij}$ ($l$) means the number of "1's" appearing in the $l$th channel between the sampling interval $t_j-l+1$ and $t_j$, normalized by the number of time points $l$. This value gives information for ascertaining the beginning of the stationary and transient sections from the input speech.

In FIGURE 1, the stability detector 5 computes the stability $S_{ij}(h/l)$ and, when equal to "1," this means that stability exists in the $i$th channel during the $j$th time interval, with threshold values of $$S_{ij}(h/l)=1 \text{ when } X_{ij}(l)\geqq h/l$$
$$S_{ij}(h/l)=0 \text{ when } X_{ij}(l)<h/l$$

Examples of stability conditions are as follows:

$$S_{ij}(6/6)=1 \text{ when } X_{ij}\ (6)=1$$
$$S_{ij}(4/5)=1 \text{ when } X_{ij}\ (5)\geqq 4/5.$$

Figure 10:
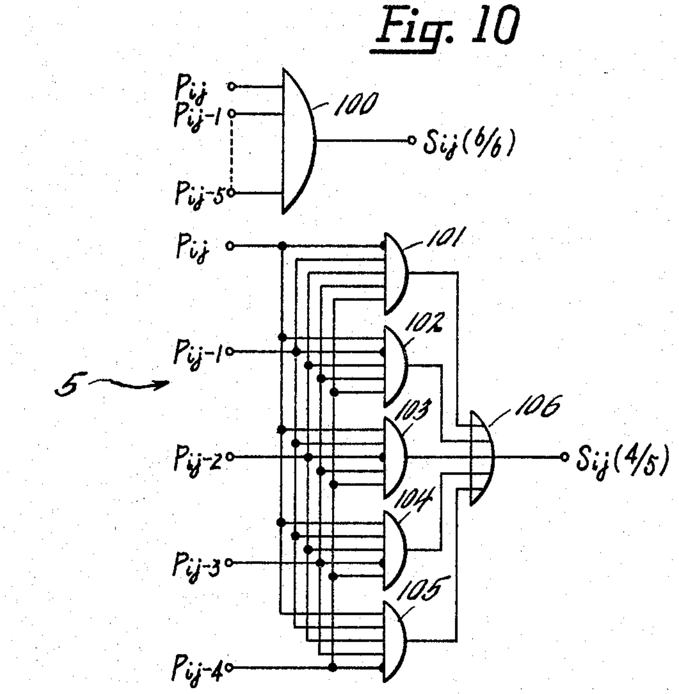
FIGURE 10 is a logic circuit diagram of a stability detecting circuit.

This is carried out by the logic circuit of FIGURE 10 as used for each channel. The detection of $S_{ij}$ (6/6) is, accomplished by six input AND gate 100, which gives a "1" output only when all input conditions $P_{ij}$–$P_{ij-5}$ "1". For detection of $S_{ij}$ (4/5), five AND gates 101–105 for five inputs $P_{ij}$ to $P_{ij-4}$ are connected with one of the inputs (dotted) being the complement of the $P_{ij}$ condition. The AND gates are all connected to OR gate 106 to provide the corresponding $S_{ij}$ (4/5) output signal when any one input gate 101–105 meets the required condition.

The stability is computed for each channel and in each time interval and therefore ($S_{ij}$) for a given value $h/l$ makes a stability pattern similar to ($P_{ij}$). This may be charted as follows:

| | | | | | | | | | | | |
|---|---|---|---|---|---|---|---|---|---|---|---|
| Sampling point (j), | 1 | 2 | 3 | 4 | 5 | 6 | 7 | 8 | 9 | 10 | 11 |
| Input pattern of channel (i) | 0 | 1 | 1 | 1 | 1 | 1 | 1 | 1 | 0 | 1 | 0 |
| $S_{ij}$ (6/6) | 0 | 0 | 0 | 0 | 0 | 0 | 1 | 1 | 0 | 0 | 0 |
| $S_{ij}$ (4/5) | 0 | 0 | 0 | 0 | 1 | 1 | 1 | 1 | 1 | 1 | 0 |

The section of the input speech during which stability is detected in both the F1 and F2 regions, may be regarded as a segment corresponding to a phoneme element, since the existence of stability implies the existence of the formant in that channel.

Considering stability from the representation of FIGURE 2, using the fourth channel in the F2 region, six black points ("1") continue from $t_1$ to $t_6$ and then vanish at $t_7$. The fact that the stability is detected signifies the presence of one phoneme and the fact that the points which have lasted so long vanish signifies an important change, which are indicated in the stability detector circuit output signals, and which are utilized as input signals to the transition detector circuits 8 and vowel section detector 9 of FIGURE 1.

*Distance*

The distance $d_j$, as related to FIGURE 2 (7, 3, 5, 3 etc.) can be defined as the number of changed channels between $t_j$ and $t_{j-1}$. Thus the distance between $t_1$ and $t_2$ is seven since channels 1, 2, 3, 7 of F2 and 1, 3, 4, of F1 are changed. The fact that there are changes in many of the channels of the analyzed pattern as shown in FIGURE 2 suggests that changes from one sound to a different one are occurring in this analyzed time period of the input speech pattern. When the distance is large it suggests a plosive such as a "$p$," "$t$" or "$k$," so that the input signal to plosive detector 7 of FIGURE 1 is derived from distance detector 6.

Figure 11:
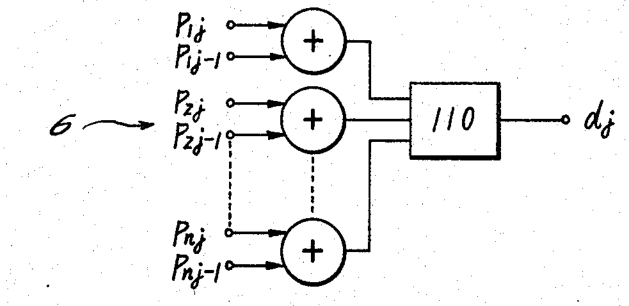
FIGURE 11 is a logic circuit diagram of a distance detecting circuit.

The distance $d_j$ is defined as $$\sum_i (P_{ij} \oplus P_{ij-1})$$

where $\oplus$ is the exclusive OR function. Thus, the distance detector comprises exclusive OR circuits for each channel all coupled to counter 110, as shown from the logic diagram of FIGURE 11. With each exclusive OR connected to $P_{ij}$ and the corresponding $P_{ij-1}$, the output signal is "1" when a change has occurred at that time interval. The number of these changes is accumulated in counter 110 to give the output number of the change $d_j$.

*Transition detection and segmentation*

Transition detector 8 of FIGURE 1 generates a segmentation signal to distinguish a section (segment) of speech sound corresponding to a single phoneme from the other. In speech sound there are some regions termed the transition part, where speech parameters change abruptly or gradually, and these regions serve to define the beginning and the end of a speech sound segment. Such segmentation indications is, in short, to decide between consonants and vowels, and to determine the segments of each phonemes in a vowel section.

The segmentation or transition signal is determined by simple logical circuits described later with reference to FIGURE 12 for detecting a new combination of stabilities $S_{ij}$ in the F1 and F2 regions as illustrated on dotted line A of FIGURE 8, and by the detection of stability in a new channel where it already exists in the other formant region as typified from dotted line B.

*Vowel section detection*

It is in the vowel section detector 9 of FIGURE 1 that the provisional vowel section of the speech sound derived in extractor in the phoneme classifier 2 is processed, as later described. Thus, the vowel section is logically processed with input signals from block 5 and 6 to find out the precise vowel section for input to the sample control block 10. This logic, as shown in the lower portion of FIGURE 12, is concerned with the stability which indicates a vowel and a small distance $d_j$ which means the speech does not change markedly during the sampling time. The resulting vowel sampling signal controls the sampling interval in analyzer 4 for vowel analysis. On the other hand, the timing operation of block 11 as derived in block 10 is based upon the segmentation signals (*d*) of FIGURE 8, introduced from transition section 8 as represented in the upper region of FIGURE 12.

Figure 12:
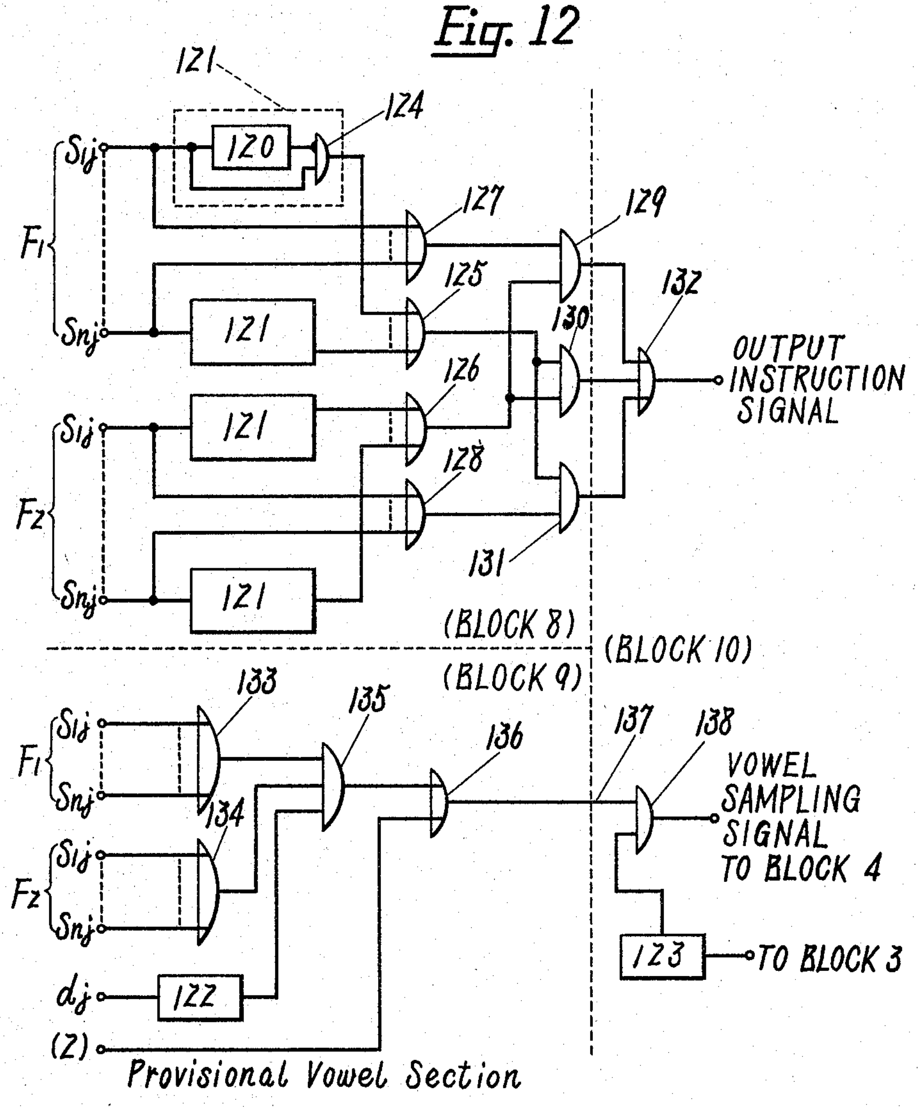
FIGURE 12 is a logic circuit diagram of circuits for determining vowels, transition points and sample selection for generating output instruction signal.

In determining the transition point, the beginning of the stability ($S_{ij}$) of each channel is detected by differentiation circuits 121 (FIGURE 12). Each such circuit includes a register 120 for delaying the $S_{ij}$ by one sampling interval, and an inhibiting AND gate 124. Two OR gates 125 and 126 are respectively assigned the output signals in the F1 and F2 regions as supplied by differentiation circuit 121. Further OR gates 127 and 128 are assigned the input $S_{ij}$ of the respective F1 and F2 channels. These signals are paired in AND gates 129, 130, 131 for introduction at OR gate 132 to provide an output instruction or segmentation signal, for introduction to phoneme discriminator circuit 11 of FIGURE 1.

In the vowel section detector 9, $S_{ij}$ signals of the F1 and F2 regions are processed through respective OR gates 133, 134 (FIGURE 12) to indicate the presence of stability in the respective regions. Also, the magnitude of distance $d_j$ is checked in logical threshold circuit 122 which gives a signal unless the value exceeds a predetermined magnitude. Thus, when the $d_j$ signal has a small value and stability exists in some channels of both regions F1 and F2, the AND gate 135 will show the presence of a vowel. The signal from extractor circuits in phoneme classifier 2 of FIGURE 1 signifying a provisional vowel section is coupled at OR gate 136 to send to sample control circuit 10 the vowel output signal at lead 137.

The vowel output signal lead 137 samples at AND gate 138 of the sample control section 10 the rectangular pulse train of the periods of 20 ms. for example supplied from astable multivibrator circuit 123. This results in the vowel sampling signal which generates a train of pulses of 20 ms. period during the vowel section for the successive sampling in analyzer circuit 4 of FIGURE 1. The output of the astable multivibrator 123 is also lead to the analog digital converter circuit 3 of FIGURE 1.

*Plosive*

The fact that the distance $d_j$ is large suggests a plosive. Thus the plosive detection section 7 of FIGURE 1 has as input signal the distance signal $d_j$, and serves to determine when it exceeds a predetermined threshold magnitude, to send such information as a control signal to block 2 of FIGURE 1.

II. RECOGNITION FUNCTIONS

Figure 9:
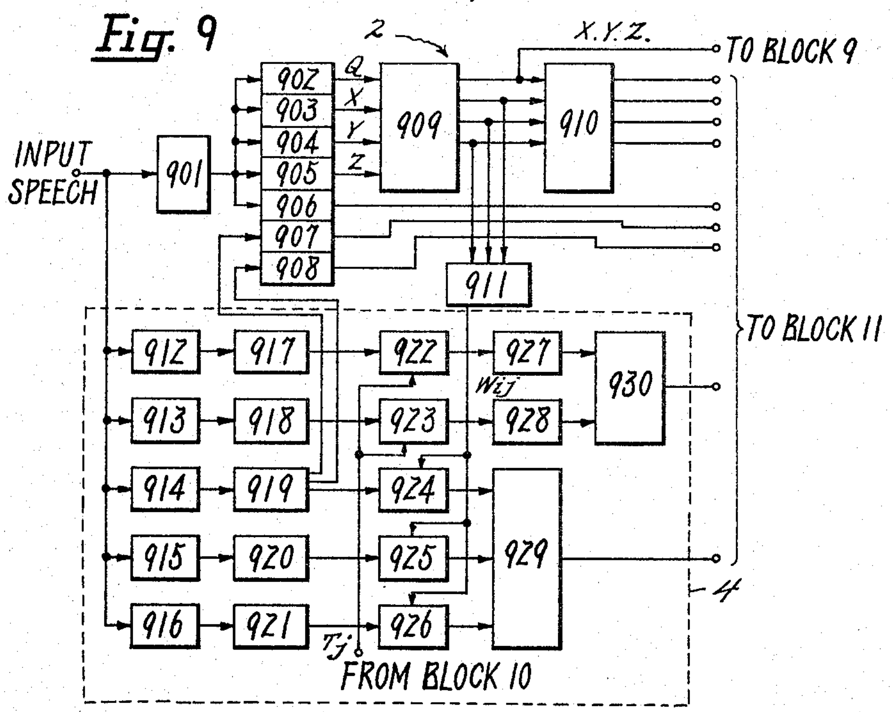
FIGURE 9 is a block circuit diagram of a phoneme classifier and analyzer.

Under control of the speech sound itself as processed in the circuits thus described, the remainder of the system of FIGURE 1 serves to recognize and process voice speech patterns introduced at the voice source circuits 1. As shown by FIGURE 9 the input speech signals are processed in phoneme classifier and analyzer circuits 4. The upper portion of FIGURE 9 relates to extraction and the lower part in the dotted box 4 to analysis.

*Extraction and classification*

The principal functions of phoneme classification circuit of block 2, FIGURE 1 are (1) to detect the envelope of the input speech sound and to filter out different components of speech sound in blocks 901–905, of FIGURE 9, (2) to select further distinctive features in blocks 906–908, (3) to generate from the speech components signals dividing the speech into several class of sections at block 909 and a consonant sampling signal at block 911, and (4) thereof to classify input speech waves into several phoneme groups at block 910.

When speech enters the filter circuits 901, the low frequency fundamental component of the vibration of the vocal cords and the high frequency components representative of the formants and noise components are separated, each output sent to 902–906 together with the input speech sound itself. Speech duration detector 902 produces an output Q with value of "1" when the low frequency speech envelope magnitude exceeds a preset threshold level. Similarly, the output signal X of the high frequency detector 903 will be "1" when exceeding the preset threshold level. Pitch detector 904 will provide signal Y equal to "1" when the output of a low pass filter exceeds a preset threshold level. Comparator circuit 905 provides an output Z of "1" when the output level of a high pass filter exceeds that of a low pass filter.

Logic circuits 909 perform several functions on the input binary variables Q, X, Y and Z to segment the input speech sound into the sections representative of the class of phonemes. Thus, the vowel section is $X \cdot Y \cdot Z$, the unvoiced consonant interval $X \cdot Y \cdot Z$, the voiced consonant section $\overline{X} \cdot Y \cdot \overline{Z}$ and the nasal section $X \cdot Y \cdot \overline{Z}$, where a logical complement is noted with a bar. The vowel section is introduced into the vowel section detection block 9 of FIGURE 1 as the provisional vowel signal heretofore described.

Phoneme classifier 910 decides whether each section determined in 909 represents a characteristic of the speech or a false indication. For example, an $X \cdot Y \cdot X$ condition continuing more than 50 ms. shows the presence of a vowel, etc., so that the block may represent simply a timing device which produces four output signals for the register of block 11 of FIGURE 1, each representing vowel, unvoiced consonant, voiced consonant and nasal consonant.

Stop consonant detector 906 picks up an abrupt rise of magnitude in the higher frequency component of speech sound, if it is at the beginning of the speech interval, and produces a binary "1" signal when the stop consonant is present. Features in blocks 907 and 908 are derived from the analysis section 4 as hereinafter described.

*Analysis*

The analysis function of block 4 has both vowel and consonant analyzer channels. The vowel analysis portion thus corresponds in operation to the hereinbefore described FIGURE 6 and comprises blocks 912, 913, 917, 918, 922, 923 where the difference is the use of 5 channels in the F1 region and 3 channels in the F2 region for the zero-crossing analysis. Thus, the accumulation $W_{ij}$ is derived at blocks 922 and 923 responsive to timing $T_j$ from the sampling control block 10 (FIGURE 1). The timing signal $T_j$ occurs only during the vowel section and is repeated for typical durations of 20 ms.

Peak detectors 927 and 928 serve to select a peak channel in both the F1 and F2 sections, so that vowel judging matrix 930 can identify the vowel and store it in the memory register of block 11. This operation is repeated for every sampling interval.

Consonant analyzing filters 914, 915 and 916 are designed to extract the features of the unvoiced consonant, the voiced consonant and the nasal consonant respectively. The zero-crossing analysis continues in blocks 919, 920, and 921 to pass signals through integrating counters 924, 925 and 926 into quantization circuit 929, which converts the distribution into binary form indicated by the threshold levels set for each channel, so that they may be stored in the memory register of block 11. A sampling signal derived in circuit 911 is applied once for each consonant section to the integrating counters.

Special feature circuit 907 comprises a zero-crossing number detector counting the total zero-crossing number from block 919 in the nasal component channel. Fricative consonant detector 908 counts the number of rectangular waves of the zero-crossing wave whose width is shorter than say 150 microseconds, to derive a recognition signal for the fricative consonant.

*Zero-crossing*

A more detailed description of the zero-crossing analysis may be made with reference to the defining waveform and block circuit diagram of FIGURE 5. The zero-crossing wave is a rectangular wave generated from the original speech wave pattern when greatly amplified and clipped to two constant levels as shown in the waveform diagram. This provides a time indication at a plurality of the zero-level points about the reference line.

The each width of the rectangular wave may be measured successively in such way as classify it into one of several channels and the measured results are accumulated for time intervals $T_j$ of 20 ms. to give for each interval a zero-crossing distribution. Denoting $N_{ij}$ as the number of the width of the wave classified in the *i*th channel of center value $V_i$, whose channel width is $V_i$, during the *j*th time interval $T_j$ which has a time period $T_j$. Then the zero-crossing distribution $W_j$ at time interval; may be expressed:

$$W_{ij}=(W_{1j}, W_{2j}, \ldots W_{nj}),\ j=1, 2, 3, \ldots$$

and $$W_{ij}=W_i(V_i)=\frac{1}{T_j}\frac{N_{ij}V_i}{\Delta V_i}$$

Thus $W=(W_{ij})$ is a three dimensional zero-crossing pattern of count numbers in channels corresponding to intensity, frequency and time. The zero-crossing wave is obtained from input speech sound by zero crossing converter OX of FIGURE 5. This comprises a linear amplifier 501, a peak clipper 502, and a Schmitt trigger circuit 503. Pulsed oscillator 504 is triggered into oscillation when the wave switches one way and ends when it switches the other way, with high oscillation frequency compared to the width of input speech. Flip-flop 505 count the number of the oscillations during the burst and after the end of the oscillation it register a number of oscillations during each rectangular wave for entry of a count code into decoder matrix 506.

Just after the stop of oscillation readout pulser 508 generates a signal to interrogate the contents of matrix 506 to send a pulse to one of the channel corresponding to the counted oscillation number. Reset circuit 507, then, resets counters 505. This measurement is continued on each of the rectangular width during the time interval T. Integrating counters 509 integrate the number in each interval $T_j$ and produce $W_{ij}$ outputs for the *j*th time interval at the various leads $W_{ij}$ etc.

*Phoneme discriminating register*

Classified and analyzed results and detected features, introduced at phoneme discriminator 11 of FIGURE 1, from block 2 and 4 as shown in FIGURE 9 are held in the registers 701–703 of FIGURE 7. The diode decoding matrices 704 then produce a final judging or discriminating function to send results into the output utilization section 12 (FIGURE 1) when receiving an output instruction signal from the sample control circuits 10 of FIGURE 1.

The logic patterns of the diode matrices is predetermined for each phoneme by statistical analysis, so that when a pattern of unknown input speech coincides with any phoneme pattern, a coded output signal is produced.

Figure 8:
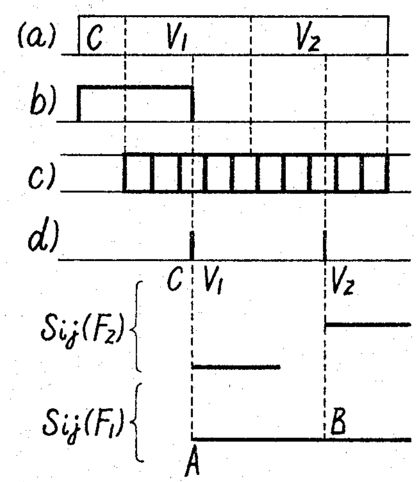
FIGURE 8 is a waveform chart illustrating operation of the circuit of FIGURE 7.

The time chart of FIGURE 8 illustrates the waveform relationship of the phoneme discriminator 11. Thus, waveform (a) represents input sound having components C for consonant and followed by vowels $V_1$, $V_2$. Waveforms (b) signifies results of the consonant analysis and phoneme classification, memorized in the registers 701 and 703, respectively. (c) represents the registration of speech elements for vowel recognition; and waveform (d) represents the segmentation signal or output instruction signal derived from the stability pattern which combines, in this case, consonant and vowel $CV_1$ and next the following vowel $V_2$.

Thus, the results from consonant analyzing system in block 4 (FIGURE 1) and the phoneme classification from block 2 are stored in the register memory and the register for vowel judgment is renewed successively every time the vowel sampling is made in block 4. When the output instruction signal arrives, the combined signals of all registers send the output code to output circuit 12. In this output circuit is a buffer register for the output code, a code converter if necessary and an electrical typewriter, printer or punched paper tape device commonly used in a communication or computing system. The buffer register serves to synchronize the typewriter printing speed with the speech, which at times exceeds the printing speed. Special codes may be included, such as a "?" when the pattern is not determinable. Also, spaces may be generated when pauses in speech occur.

*Buffer memory*

Figure 3:
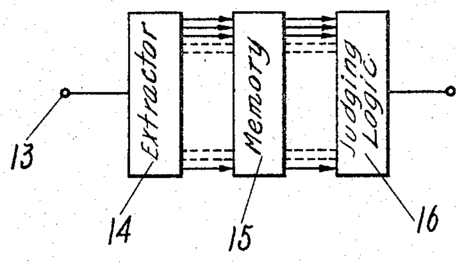
FIGURE 3 is a block diagram of a recognition system afforded by the invention for discriminating and analyzing phonemes.

The recognition procedure described above is logically described in the block diagram of FIGURE 3 to explain the operation of the judging in more detail, where the speech is introduced at input terminal 13 into the extracting circuits 14. The extracted information is stored in buffer memory 15 for use in the judging logic of block 16 as required at the time an end of a syllable instruction is introduced.

In the extracting circuits 14, corresponding to blocks 2 and 4 of FIGURE 1, the representative properties of speech are detected as hereinbefore described. The buffer memory circuit 15 holds the extracted features in a magnetic drum, tape or other sort of electronic register. More flexible judging may occur when the analyzed pattern stored in the memory is in non-processed or non-simplified form. The judging logic circuits 16 correspond to blocks 11, 12 of FIGURE 1.

In the latter circuits sequential combinations are represented in special form to simplify and make more reliable the judging. For example, a consonant is largely influenced by the following vowel and it is convenient if the determination of a vowel would precede the determination of the previously uttered consonant. Thus, the results of the analysis of the vowel in this system may be investigated first and then the parallel stored consonant analyzing channels proper to that vowel are investigated. For example, in the Japanese language if the vowel was recognized as "*a*" and the phoneme classifier detected that the preceding consonant is an unvoiced plosive, then recognition among "*ka*," "*ta*," "*pa*" will be made in the judging circuits.

Figure 4:
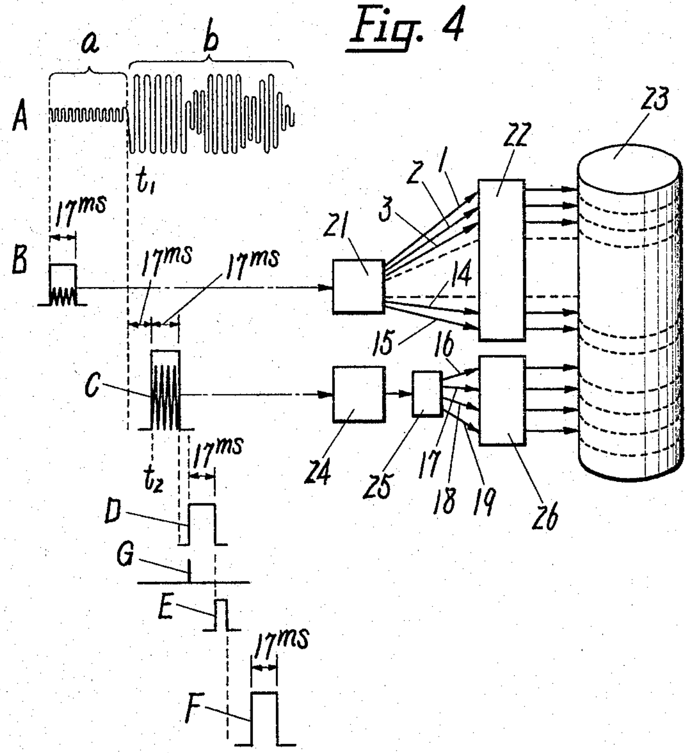
FIGURE 4 is a diagrammatic view of a buffer memory embodiment employed in the invention.

The use of a magnetic drum memory embodiment in reading in and out a spoken syllable is described in connection with FIGURE 4 where the operation for the consonant plus vowel portion of the conversational speech input is described. Then let waveform A be an example of input speech with a consonant part *a* and a vowel part *b*. Let B be a cyclic revolution of the drum during which the consonant sound is extracted.

Then C is a further cycle for extracting the vowel. Readout is accomplished by waveform D, which is followed at E with a judging operation instruction pulse. The drum is erased at cycle F and G is a read out control signal. The consonant is first extracted by B and supplied to zero-crossing wave analyzer 21 to be classified into 15 numbered channels leading to write-in circuit 22 for magnetic drums 23.

Then with a 17 ms. delay after the time $t_1$ separating consonant *a* and vowel *b*, the vowel extracted with C is introduced into wave analyzer 24 and separated into further channels by "OR" gate to be written onto drum 23 by writing circuits 26. Since the operation in the two channels is sequential, some of the circuits such as wave analysis 21 and 24 may be the same commonly switched or gated circuits.

The resulting analysis of the consonant *a* and vowel *b* will be retained on drum 23, to be read out in period D. Sounds in the respective channels may be taken out in analog form from a cathode follower, for example, and converted to digital form for judging through an array of diode gates. The terminal pulse of the speech segment is used to reset the entire extracting device.

*Judging logic*

The function of the buffer memory in the judging may be outlined by a discussion of the requirement of recognition of the Japanese language when a syllable composing the input speech sound is further divided into a vowel preceded by a consonant. Some phoneme of the consonants for example the fricative "*s*" or "*z*" can be determined substantially by themselves. But the phoneme of plosive consonants "*k*," "*t*" or "*p*" is so distinctly different, depending upon the succeeding vowel, that a common phonetic feature is difficult to detect. The nasal "*m*" or "*n*" is characterized substantially by the change of the formant frequency and the consonant comprising a contracted sound is recognized by the duration of the consonant part. Thus, the detection of consonants becomes complicated.

The extraction then detects factors such as the frequency components, pitch, voiced and unvoiced sounds, vowels and consonants, duration etc., all being stored for judgment at the same time, and by statistically determining the particular language in question, a predetermined coding pattern may be developed to accurately and reliably detect the phonemes and to convert speech into coded digital form useful in operating a phonetic typewriter.

What is claimed is:

1. A phoneme recognition system comprising an input transducer, a phoneme classifier having its input connected to said transducer, an analog-to-digital converter having its input connected to said transducer and to a sample control circuit, an analyzer having one of its inputs connected to said transducer, a stability detector and a distance detector each having its input connected to the output of the analog-to-digital converter, a plosive detector, a transition detection circuit and a vowel section detection circuit, said plosive detector having its input connected to the output of the distance detector and its output connected to the phoneme classifier, said transition detection circuit having its inputs connected to the output of the stability detector and the distance detector, said vowel section detection circuit having its inputs connected to the outputs of the phoneme classifier, the stability detector and the distance detector, said sample control circuit having its inputs connected to the outputs of the transition detection circuit and the vowel section detector, a phoneme discriminator having its inputs connected to the outputs of the phoneme classifier, the sample control circuit and the analyzer, the analyzer including an input connected to one of the outputs of the phoneme classifier, the analyzer having another input connected to one of the outputs of the sample control circuit and an output device having its input connected to the phoneme discriminator.

2. A phoneme recognition system according to claim 1, comprising a transducer for obtaining a sound pattern, a recognition portion and a control portion connected to each other and to said transducer, said recognition portion including a phoneme analyzing circuit with means obtaining a digitalized zero-crossing pattern by the measurement of zero-crossing intervals and with means for discriminating vowel and consonant sound, and an output means connected to said recognition circuit for delivering a signal indicative of each phoneme received by said transducer.

3. A phonetic typewriter system according to claim 1 for recognizing the phonemes of input conversational speech sound including means for obtaining analog sound patterns in different frequency regions, means sampling said sound patterns periodically, means converting the sampled sound patterns into digital form, means for detecting stability and distance parameters to indicate the time varying characteristics of input sound, means processing all of the signals produced in the aforesaid means to produce output control signals, and means judging from the spatial array the particular characters to be printed.

4. A phonetic typewriter system according to claim 1, including means for recognizing the phonemes of the input conversational speech sound under the control of the signals derived from the sound pattern of input sound, comprising in combination, means for detecting stability and distance from the input sound for a plurality of channels in different frequency regions, means for detecting the beginning point of stability of each channel of the said pattern, means for detecting the existence of stability in these frequency regions, means for combining the latter signals to obtain a segmentation signal which indicates the presence of a single phoneme unit, means for generating an output instruction signal to control the recognition operation of this system, means for detecting the presence of a vowel section from stability and distance and means for sampling the vowel signal as a control for the recognizing operation of system.

5. A phonetic typewriter according to claim 1, wherein a zero-crossing analysis is used to convert a conversational speech into a time pattern, comprising means for amplifying and clipping the input sound to convert the input sound into a zero-crossing wave, means for measuring and classifying into several channels the rectangular width of zero-crossing wave and for accumulating the classified results during a given time interval to obtain zero-crossing distributions, means for detecting parameters from the said distributions representing the time varying pattern, and means for processing the parameters to obtain control signals for the recognizing means.

6. In a phonetic typewriter according to claim 1 for recognizing the phonemes of the input conversational speech sound under the control of the signals derived from the sound pattern of the input sound, said phoneme classifier circuit comprising, means for filtering the input speech sound into several distinctive signals, means for detecting the envelope of speech sound, means for selecting distinctive features of said envelope to convert into a combination of binary signals, logical means for detecting a phoneme section from the combination of said signals, means for generating consonant sampling signals from said signals for controlling the consonant analysis operation performed in the analysis means, means for detecting stop consonant sounds from said signals, register means for storing said distinctive signals and said phoneme signals derived from said sound in a spatial array, and matrix means judging a phonemic sequence of signals stored in said register means by the control of the output instruction signal.

7. In a phonetic typewriter system for recognizing the phonemes of the input conversational speech sound under the control of the signals derived from the sound pattern of the input sound, an analyzer circuit which comprises means for filtering input speech sound into several distinctive signals including a zero-crossing pattern for the formant regions $F_1$, $F_2$ and for consonant recognition respectively, means for detecting peak channel of the formant regions, means for discriminating vowel sounds, means for quantizing the consonant zero-crossing distributions and means processing signals from all said means to produce output code signals representative of the input speech sound.

8. A phonetic typewriter system for recognizing phonemes of input conversational speech sound which produces control signals derived from the sound pattern to implement recognition procedures in means comprising, means for extracting distinctive features and classifying phonemes of input sound, means for analyzing and recognizing other features of the input sound, means for memorizing the output from said feature extracting and phoneme classifying means and said analyzing and recognizing means, logical means for reading the memorized results simultaneously recognizing the phonemes, responsive to a timed output instruction, means for converting said phonemes to codes, means for inserting special codes, means for resetting the register memory after the recognition, and means for converting said codes and special codes for operation of a output device.

References Cited by the Examiner

UNITED STATES PATENTS 3,166,640 1/1965 Dersch -------------- 179—1

KATHLEEN H. CLAFFY, *Primary Examiner.*

ROBERT H. ROSE, *Examiner.*

R. MURRAY, *Assistant Examiner.*